Aug. 16, 1949.   J. I. TAGGART   2,479,030
INCUBATOR
Filed Oct. 13, 1944   2 Sheets-Sheet 1

INVENTOR
Joseph I. Taggart
BY Evans + McCoy
ATTORNEYS

Aug. 16, 1949.   J. I. TAGGART   2,479,030
INCUBATOR

Filed Oct. 13, 1944   2 Sheets-Sheet 2

INVENTOR
Joseph I. Taggart
BY
Evans & McCoy
ATTORNEYS

Patented Aug. 16, 1949

2,479,030

UNITED STATES PATENT OFFICE 2,479,030

INCUBATOR

Joseph I. Taggart, Cleveland, Ohio

Application October 13, 1944, Serial No. 558,505

3 Claims. (Cl. 98—30)

This invention relates to incubators of the type in which air is caused to circulate upwardly through a hatching compartment and downwardly through a pressure compartment located alongside the hatching compartment and connected with the hatching compartment adjacent the top and bottom thereof, to receive air from the top portion of the hatching compartment and deliver air into the bottom portion thereof.

The present invention has for its object to so associate air conditioning devices with an air circulating system of the character described, as to obtain a more accurate and more quickly responsive control of the temperature and humidity of the air.

More particularly the invention resides in the provision of means for continuously bypassing a portion of the air from the upper portion of the pressure compartment through a duct in which air conditioning devices are mounted and back into the pressure chamber so as to maintain the air that passes through the hatching compartment at the proper temperature and humidity.

With the above and other objects in view, the invention may be said to comprise the incubator as illustrated in the accompanying drawings, hereinafter described and particularly set forth in appended claims, together with such variations and modifications thereof as will be apparent to one skilled in the art to which the invention pertains.

Reference should be had to the accompanying drawings forming a part of this specification, in which.

Figure 1:
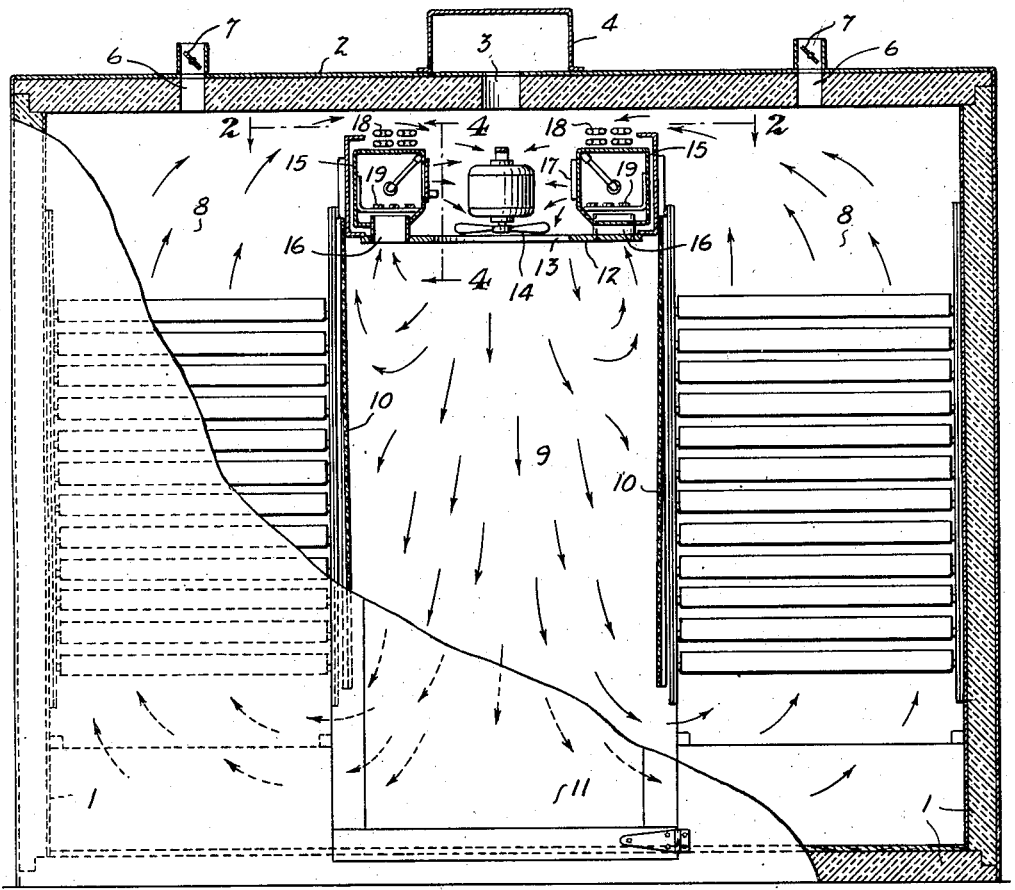
Fig. 1 is a transverse vertical section through an incubator embodying the invention.
Figure 4:
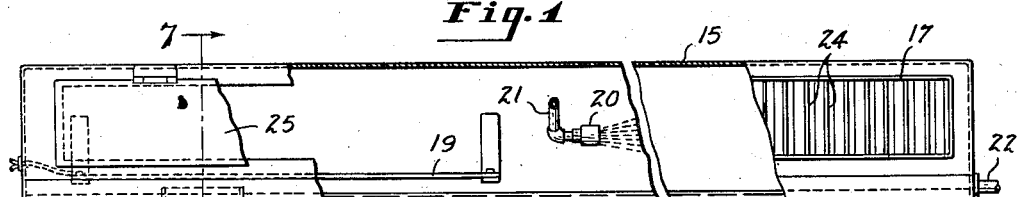
Fig. 4 is a section taken on the line indicated at 4—4 in Fig. 1.
Figure 7:
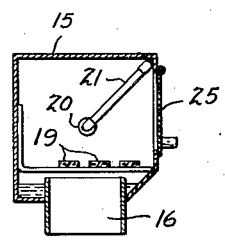
Fig. 7 is a section taken on the line indicated at 7—7 in Fig. 4.
Figure 6:
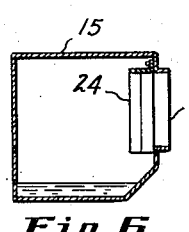
Fig. 6 is a section taken on the line indicated at 6—6 in Fig. 5.
Figure 5:
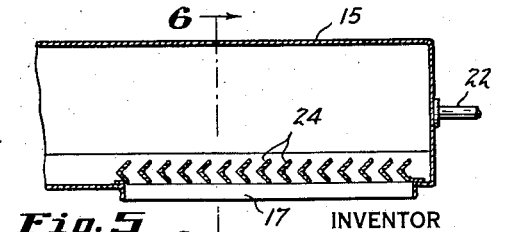
Fig. 5 is a fragmentary horizontal section through the discharge end of one of the air conditioning ducts.
Figure 2:
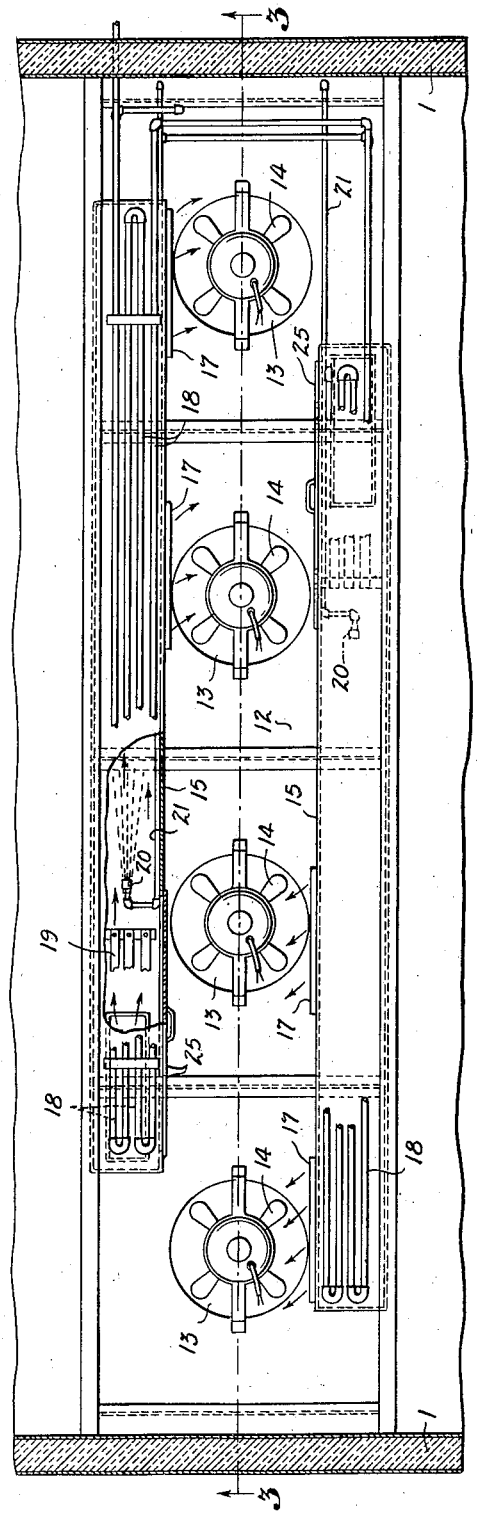
Fig. 2 is a longitudinal section taken on the line indicated at 2—2 in Fig. 1.
Figure 3:
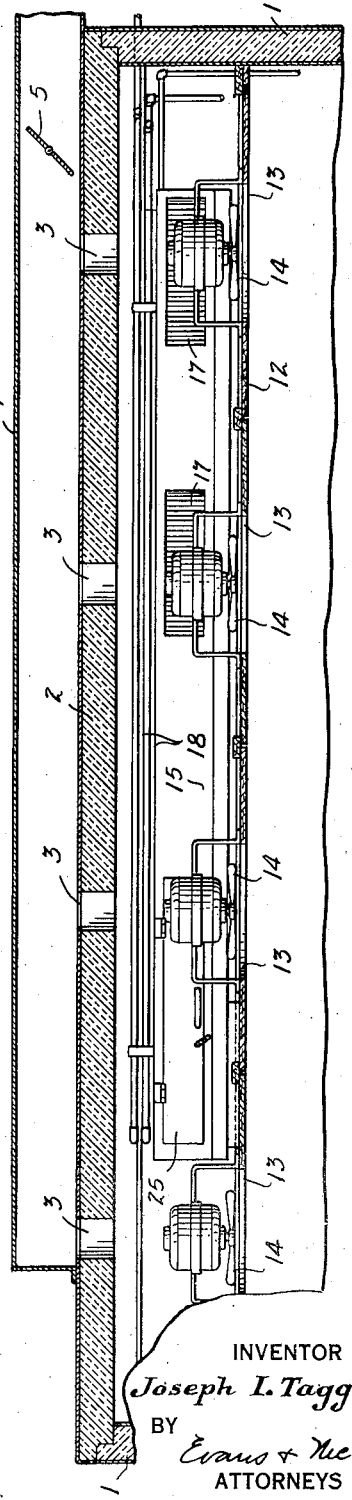
Fig. 3 is a fragmentary longitudinal vertical section through the upper portion of the incubator, taken on the line indicated at 3—3 in Fig. 2.

In the accompanying drawings the invention is shown applied to an incubator which is in the form of a chamber enclosed by a housing 1, having a top wall 2 provided with central inlet openings 3 communicating with an air duct 4 that is controlled by a damper 5 (Fig. 3). The top wall 2 also has outlet openings 6 along opposite side edges thereof which are controlled by dampers 7. The interior of the main chamber of the incubator is divided into two hatching compartments 8 along opposite sides thereof, and a central corridor 9 between the hatching compartments 8. The hatching compartments 8 may contain the usual incubating and hatching racks. The central corridor 9 is separated from the hatching compartments 8 by curtains 10, access being had to the corridor through a door 11. The corridor 9 has a ceiling 12 that is spaced below the top wall 2 of the main chamber and this ceiling is provided with a central row of openings 13 above which is mounted a row of fans 14, one above each opening, which serve to force air downwardly into the corridor 9 where the pressure of the air is higher than in other portions of the incubator and which may be referred to as a pressure compartment.

The space above the ceiling 13 is in communication with the top portions of the hatching compartments 8 and the curtains 10 terminate above the floor of the main chamber so that air from the central pressure compartment 9 may enter the hatching compartments 8 near their lower ends and circulate upwardly past the egg trays to the top of the main chamber, where the air is drawn by the fans 14 and forced downwardly into the pressure compartment 9. During operation of the incubator fresh air enters through the duct 4 and openings 3 and a corresponding amount of air escapes through the openings 6, the rate of entry and discharge of air being regulated by the dampers 5 and 7.

It is desirable that means be provided for accurately regulating the temperature and humidity of the air passing through the hatching racks, and means is therefore provided for conditioning the air within the incubator. As herein illustrated, two air conditioning ducts 15 are mounted above the ceiling 12 of the pressure compartment, one on each side of the row of fans 14. The two air conditioning ducts 15 may be of identical construction, each having an inlet 16 at one end in the bottom thereof that opens to the pressure chamber 9 through the ceiling 12. Two ducts 15 are oppositely arranged, one having its inlet opening adjacent one end of the pressure chamber 9 and the other having its inlet adjacent the opposite end of the pressure chamber. Each of the ducts 15 has lateral outlets in the end portion thereof opposite its inlet end and each outlet 17 faces inwardly alongside one of the fans 14. As herein shown, each of the ducts 15 has two lateral outlets, the outlets of one duct being alongside the two fans over one end portion of the pressure compartment 9 and the other two outlets being opposite to the two fans over the opposite end portion of the pressure compartment. Since the inlet 16 of each duct 15 opens to the pressure compartment 9 and the outlets 17 of each duct open to low pressure areas above the fans, a substantial portion of the air forced downwardly into the pressure chamber 9 by the fans 14 will be bypassed through the air conditioning ducts 15.

Along the tops of the ducts 15, cooling coils 18 are provided through which water is circulated. Within each of the ducts adjacent its inlet 16 there is mounted an electrical heater 19, and inwardly of the heater 19 there is mounted a spray nozzle 20 which is directed longitudinally of the duct toward the outlet end thereof. Each spray nozzle is supplied by a pipe 21 which may be connected to the cooling coil so that the temperature of the water delivered to the spray is substantially that of the air in the incubator. The operation of the electrical heating elements 19 is preferably controlled automatically by a thermostat and the operation of the spray nozzles 20 by a humidostat as disclosed in my Patent No. 2,281,339, April 28, 1942.

In view of the fact that a substantial portion of the air is continuously bypassed through the air conditioning ducts, the action of the heating elements 19 and humidifying nozzle 20 is effective to quickly change the temperature and humidity of the air being circulated through the hatching compartments when the heaters or sprays are operated by means of the automatic controls, and more accurate regulation of temperature and humidity is obtained.

Water discharged through the nozzle 20 may accumulate in the bottom of each duct 15 and the level of water in the bottom of the duct is regulated by a drain pipe 22. In order to prevent drops of water passing with the air through the outlets 17, each outlet is preferably provided with a louver 24 which has angle shaped bars forming water collecting baffles. A door 25 may be provided in the side wall of each duct adjacent its inlet end, through which access may be had to the heaters and spray nozzles.

The device of the present invention provides a relatively inexpensive and highly efficient air conditioning apparatus which is so associated with the air circulating means that the heating, cooling and humidifying devices are operable to quickly correct variations from proper conditions within the incubator under the control of the automatic temperature and humidity regulating devices.

It is to be understood that variations and modifications to the specific device herein shown and described for purposes of illustration, may be made without departing from the spirit of the invention.

What I claim is:

1. An incubator comprising a main chamber having a hatching compartment and an elongated pressure compartment alongside the hatching compartment and communicating with the hatching compartment adjacent the floor of the chamber, said pressure compartment having a ceiling spaced from the top of the main chamber and provided with longitudinally spaced openings, the space above said ceiling being in communication with the upper portion of the hatching compartment, a fan over each of said openings for drawing air from the upper portion of the hatching compartment and delivering the same through the opening into the pressure compartment, a duct mounted above said ceiling alongside said fans, said duct having an inlet adjacent one end opening directly to the upper portion of the pressure chamber and lateral outlet openings alongside a plurality of said fans, and air heating and humidifying means in said duct between said inlet and the first of said outlet openings.

2. An incubator comprising a main chamber having hatching compartments along opposite sides thereof and a central corridor forming a pressure compartment between said hatching compartments, said pressure compartment communicating with said hatching compartments adjacent the floor and having a ceiling spaced from the top of the main chamber, the space above said ceiling being in communication with the upper portions of the hatching compartments, said ceiling having a central row of openings, a row of cans, one above each opening, for drawing air from the upper portions of the hatching compartments and delivering the same downwardly through the openings into the pressure compartment, a duct extending along each side of said row of fans, each duct having an inlet at one end communicating with one end of the pressure chamber adjacent the top thereof and outlets in its opposite end portion alongside a plurality of said fans, the inlets of said ducts being adjacent opposite ends of said pressure chamber, and air heating and humidifying means in each of said ducts between its inlet and the said outlet openings.

3. An incubator comprising a main chamber having hatching compartments along opposite sides thereof and a central corridor forming a pressure compartment between said hatching compartments, said pressure compartment communicating with said hatching compartments adjacent the floor and having a ceiling spaced from the top of the main chamber, the space above said ceiling being open to the upper portions of the hatching compartments, said ceiling having a central row of openings and an opening at each end spaced laterally of the central row, one on each side of the central row, a row of fans, one above each of the openings of the central row, for discharging air downwardly into the pressure compartment, a duct along each side of said row of fans, each duct having an inlet opening on its under side registering with one of the laterally spaced openings and a plurality of inwardly facing outlet openings, each outlet opening facing a fan, air heating means in each duct, and a water jet adjacent the inlet of each duct disposed centrally of the duct and discharging toward the outlet end of the duct.

JOSEPH I. TAGGART.

REFERENCES CITED

The following references are of record in the file of this patent:

UNITED STATES PATENTS

| Number | Name | Date |
|---|---|---|
| 1,262,860 | Smith | Apr. 16, 1918 |
| 2,319,091 | Smith | May 11, 1943 |